(12) United States Patent
Seiger

(10) Patent No.: US 11,109,609 B2
(45) Date of Patent: Sep. 7, 2021

(54) NON-DAIRY HIGH-DENSITY KOSHER FROZEN DESSERT PRODUCT AND PROCESS THEREFOR

(71) Applicant: BELGIAN GOURMET LTD., Beit Shemesh (IL)

(72) Inventor: Micheline Seiger, Beit Shemesh (IL)

(73) Assignee: BELGIAN GOURMET LTD., Beit Shemesh (IL)

( * ) Notice: Subject to any disclaimer, the term of this patent is extended or adjusted under 35 U.S.C. 154(b) by 0 days.

(21) Appl. No.: 15/873,919

(22) Filed: Jan. 18, 2018

(65) Prior Publication Data

US 2018/0139983 A1 May 24, 2018

Related U.S. Application Data

(63) Continuation of application No. PCT/IL2016/000015, filed on Jul. 21, 2016.

(60) Provisional application No. 62/195,343, filed on Jul. 22, 2015.

(51) Int. Cl.
| | |
|---|---|
| *A23G 9/04* | (2006.01) |
| *A23G 9/32* | (2006.01) |
| *A23L 9/20* | (2016.01) |
| *A23L 15/00* | (2016.01) |
| *A23L 35/00* | (2016.01) |
| *A23G 9/34* | (2006.01) |
| *A23G 9/38* | (2006.01) |

(52) U.S. Cl.
CPC .................. *A23G 9/04* (2013.01); *A23G 9/32* (2013.01); *A23G 9/325* (2013.01); *A23G 9/34* (2013.01); *A23G 9/38* (2013.01); *A23L 9/20* (2016.08); *A23L 15/00* (2016.08); *A23L 35/10* (2016.08); *A23V 2002/00* (2013.01); *A23V 2200/266* (2013.01); *A23V 2300/20* (2013.01)

(58) Field of Classification Search
CPC ..................................... A23G 9/04; A23G 9/32
USPC .................................................. 426/565, 660
See application file for complete search history.

(56) References Cited

U.S. PATENT DOCUMENTS

2007/0071874 A1* 3/2007 Cash ...................... A23C 13/12
426/601

FOREIGN PATENT DOCUMENTS

GB 1467422 * 3/1977

OTHER PUBLICATIONS

Arbuckle et al Ice cream 2nd Edition The AVI Publishing Group p. 96 (Year: 1972).*
Merium-Webster "RoomTemperature" pages printed Jan. 2019 pp. 1-2 (Year: 2019).*
Grey, Joe "Frozen assets" Chicago Tribune pp. 1-3 Oct. 10, 2012 https://www.chicagotribune.com/living/ct-xpm-2012-10-10-sc-food-1005-semifreddo-20121010-story.html (Year: 2012).*

(Continued)

*Primary Examiner* — Kelly J Bekker
(74) *Attorney, Agent, or Firm* — Eva Leah Taksel

(57) ABSTRACT

The present invention provides novel non-diary frozen desserts and methods of preparation thereof, the method including forming a first mixture by mixing water and stabilizer, mixing ingredients with the first mixture to form a light mix, folding the light mix with at least one pre-pasteurized egg product to form a heavy mix and freezing the heavy mix for less than twenty minutes to form the non-dairy frozen dessert.

10 Claims, 2 Drawing Sheets

(56) References Cited

OTHER PUBLICATIONS

Clay "Home-made ice cream recipes: Ice and easy does it every time" pp. 1-3 https://www.telegraph.co.uk/foodanddrink/recipes/3344 Jul. 2008 (Year: 2008).*
Lopez-Alt, J. Kenji "Real Ice Cream Without the Machine" pp. 2-6 Jun. 2011 https://sweets.seriouseats.com/2010/07/how-to-make-ice-cream-without-an-ice-cream-maker-the-food-lab.html (Year: 2011).*
Grossman, Kayla "How to Make Coconut Whipped Cream: Dairy-free & delicious" https://blog.radiantlifecatalog.com/bid/70411/How-to-Make-Coconut-Whipped-Cream-Dairy-free-delicious pp. 1-4 Mar. 2014 (Year: 2014).*
Sylvie "Honey Yogurt Semifreddo Recipe with Raspberries and Pistachios" pp. 1-8 https://gourmandeinthekitchen.com/honey-yogurt-semifreddo-recipe/ Jun. 2013 (Year: 2013).*
Dictionary.com "Pasteurize" printed Jan. 2019, p. 1 https://www.dictionary.com/browse/pasteurize (Year: 2019).*
USDA USDA Basic Report:01125, Egg, yolk, raw, fresh p. 1 printed Jan. 2019 https://ndb.nal.usda.gov/ndb/foods/show/01125?fgcd=&manu=&format=&count=&max=25&offset=&sort=default&order=asc&qlookup=Egg%2C+yolk%2C+r (Year: 2019).*
Phillips, Sarah "Mixing Method—Folding" 2000 pp. 1-9 https://www.craftybaking.com/howto/mixing-method-folding (Year: 2000).*
Arbuckle et al Ice cream 2nd Edition The AVI Publishing Group 1972, pp. 246-247 (Year: 1972).*
USDA Basic Report 01125, 01123 and 01053 pp. 1-3 printed Sep. 2019 https://ndb.nal.usda.gov/ndb/search/list (Year: 2019).*
PastryChef Ice cream & Sorbet Stabilizers pp. 1-2 Sep. 2012 https://www.pastrychef.com/ICE-CREAM-amp-SORBET-STABILIZER_p_761.html (Year: 2012).*
Rohrig Ice, Cream . . . and Chemistry pp. 1-6 Feb. 2014 https://www.acs.org/content/acs/en/education/resources/highschool/chemmatters/past-issues/archive-2013-2014/ice-cream-chemistry.html (Year: 2014).*
Aquacalc.com pp. 1-4 printed Sep. 2019 https://www.aqua-calc.com/calculate/food-volume-to-weight (Year: 2019).*
Reference.com "How much Does an Egg Yolk Weigh" p. 1 printed Sep. 2019 https://www.reference.com/food/much-egg-yolk-weigh-8669f9d8f0c43169 (Year: 2019).*
Diabetes.co.uk "Low Calorie Sweeteners" pp. 1-2 Jun. 3, 2014 https://www.diabetes.co.uk/diabetes_care/Diabetes_and_low_calorie_sweeteners.html (Year: 2014).*

* cited by examiner

NON-DAIRY HIGH-DENSITY KOSHER FROZEN DESSERT PRODUCT AND PROCESS THEREFOR

FIELD OF THE INVENTION

The present invention relates generally to non-dairy frozen desserts, and more specifically to methods for preparation of non-dairy frozen desserts.

BACKGROUND OF THE INVENTION

There is a growing population of people who cannot digest milk products or are allergic thereto. Additionally, many consumers do not want to consume cow milk containing food or beverage products. Many religions require abstinence from pig products. The Jewish religion further requires not eating or cooking milk products and meat products together. There is thus a growing consumer population which requires non-dairy food and beverage products.

Many attempts have been made to make non-dairy frozen desserts. Some patent publications in the field include, U.S. Pat. No. 4,643,906, which describes a lactose-free synthetic ice cream product comprising from about 45% by weight of a liquid non-dairy emulsion containing vegetable fat, from about 25% of a stable foamed non-dairy emulsion including hydrogenated vegetable fat, approximately 15% by weight of sucrose, and approximately 15% by weight of raw eggs.

U.S. Pat. No. 7,592,030 describes a food product or composition, which has from about 23% to about 42% by weight of at least one of the group consisting of almonds and cashews, wherein the almonds and/or cashews have been finely ground, from about 27% to about 65% by weight of a liquefying agent capable of forming a cream when combined with the almonds and/or cashews, from about 10% to about 19% by weight of a sweetening agent, and from about 0.0003% to about 0.0005% by weight of salt. The composition is made by grinding from about 23% to about 42% by weight of at least one of the group consisting of almonds and cashews, and adding from about 27% to about 65% by weight of a liquefying agent to form a cream. To this cream is added from about 10% to about 19% by weight of a sweetening agent, and from about 0.0003% to about 0.0006% by weight of salt, to form a mixture, which may then be frozen.

US 20120121775 describes a constructed non-dairy ice cream, which is prepared by making an aqueous emulsion of a flavorful non-dairy fat composition, dispersing an emulsion stabilizer in the aqueous emulsion, warming the stabilized emulsion to a sub-boiling temperature, and then freezing the emulsion to a temperature below a melting point of the flavorful non-dairy fat composition.

WO 2015047200 A1 discloses a simple and cost effective method to make ice cream, and related frozen dairy and non-dairy desserts, with end-user controlled and variable texture, freezing rate, melting point and eating qualities without the use of traditional, home or industrial ice cream machines and a product made by this method. The process entails the creation of a stabilized food foam and then the incorporation of said foam into a stabilized serum base solution under near equilibrated osmotic pressure conditions at preset ratios resulting in easily controlled and variable solids content and overrun, and then freezing that product till desired hardness is achieved. The main execution of this process involves the use of dry powders that are transported and sold dry and then reconstituted by the end user before they are combined. The invention offers significant improvement over existing manufacturing method in terms of cost, convenience, and environmental impact.

Many non-dairy ice creams are unpalatable, gritty, non-kosher, hard or leave an after-taste. Others are too light, sweet and fluffy, reminding the consumer of candy-floss.

There is thus still a need to provide very tasty non-dairy frozen desserts/ice creams with improved texture and consistency and improved methods for production therefor.

SUMMARY OF THE INVENTION

It is an object of some aspects of the present invention to provide improved non-dairy frozen desserts and production methods therefor.

In some embodiments of the present invention, improved methods and are provided for manufacturing non-dairy frozen dessert on an industrial scale.

In some embodiments of the present invention, improved methods and are provided for manufacturing non-dairy frozen dessert on a small scale.

In other embodiments of the present invention, an improved non-dairy frozen dessert product is provided.

In additional embodiments of the present invention, an improved non-dairy high-quality frozen dessert product is provided.

In additional embodiments of the present invention, an improved non-dairy low-sugar frozen dessert product is provided.

In further embodiments of the present invention, an improved non-dairy high-density frozen dessert product is provided.

In yet further embodiments of the present invention, an improved non-dairy no-sugar frozen dessert product is provided.

In yet further embodiments of the present invention, an improved non-dairy high-protein frozen dessert product is provided. The dessert may be a frozen dessert, an ice cream or a sorbet.

In additional embodiments of the present invention, an improved method is provided for producing a frozen dessert product without heating the product.

In further embodiments of the present invention, an improved method is provided for producing a frozen dessert product without a heating step.

In yet further embodiments of the present invention, an improved non-dairy low ice crystals frozen dessert product is provided.

In yet further embodiments of the present invention, an improved non-dairy no ice crystals frozen dessert product is provided.

The present invention provides novel non-dairy frozen desserts and methods of preparation thereof, the method including forming a first mixture by mixing water and stabilizer for under one minute, mixing ingredients with the first mixture for two to twenty minutes to form a light mix, folding the light mix with at least one pre-pasteurized egg product for less than one minute to form a heavy mix and freezing the heavy mix with a batch freezer for less than twenty minutes to form the non-dairy frozen dessert.

The present invention provides novel non-dairy frozen desserts and methods of preparation thereof, the method including:
a. forming a first mixture by mixing water, sugar and a stabilizer for under twenty minutes;
b. mixing ingredients with said first mixture for under thirty minutes to form a light mix;

c. folding said light mix with at least one pre-pasteurized egg product for less than twenty minute to form a heavy mix; and d. freezing said heavy mix for less than twenty minutes to form the non-dairy frozen dessert.

Additionally, according to an embodiment of the present invention, the first mixture is formed using a ratio of water:stabilizer of 500:1 to 50:1. Moreover, according to an embodiment of the present invention, the forming step is a forming an emulsion step.

Further, according to an embodiment of the present invention, the water is selected from the group consisting of boiled water, distilled water, pasteurized water, deionized water and tap water.

Yet further, according to an embodiment of the present invention, the emulsion is an oil-in-water emulsion.

Additionally, according to an embodiment of the present invention, the ingredients include at least one flavor, a sweetening agent and a non-dairy cream or creamer.

Importantly, according to an embodiment of the present invention, the sweetening agent is selected from sugar, dextrose, syrup, an artificial sweetener, agava syrup stevia and other sweetening agents and combinations thereof.

According to an embodiment of the present invention, the non-dairy cream weight to the first mixture weight is in a weight ratio of 1000:1 to 5:1.

Moreover, according to an embodiment of the present invention, the at least one pre-pasteurized egg product is in ratio of 1:10 to 1:2 with the water.

According to some embodiments of the present invention, novel non-dairy frozen desserts do not contain eggs.

Optionally, according to an embodiment of the present invention, the at least one pre-pasteurized egg product is in ratio of 1:100 to 1:2 with the water.

Notably, according to an embodiment of the present invention, the method takes less than 120 minutes on an industrial scale.

In some cases, according to an embodiment of the present invention, the method takes less than 60 minutes.

Additionally, according to an embodiment of the present invention, the method takes less than 45 minutes.

Furthermore, according to an embodiment of the present invention, the method is performed at a temperature of less than 20 degrees Celsius.

Preferably, according to an embodiment of the present invention, the method is performed at a temperature of less than 15 degrees Celsius.

Further, according to an embodiment of the present invention, the method is performed at a temperature of less than 10 degrees Celsius.

There is thus provided according to another embodiment of the present invention, a frozen dessert prepared according to the methods described herein. There is thus provided according to another embodiment of the present invention, A non-dairy vegetarian kosher frozen dessert including:

a. water in a weight concentration range of 20 to 40%;

b. a non-dairy topping or base in a weight concentration range of 20 to 40%;

c. a stabilizer in a weight concentration range of 0.1 to 1%;

d. at least one sweetening agent in a weight concentration range of 1-10%; and e. at least one of mixed eggs and egg yolks in a weight concentration of 0 to 20%;

wherein the non-dairy frozen dessert is up to 5% protein and of a density of at least 0.5 g/cm$^3$.

There is thus provided according to another embodiment of the present invention, a frozen dessert prepared according to the methods described herein. There is thus provided according to another embodiment of the present invention, A non-dairy vegetarian kosher frozen dessert including:

a. water in a weight concentration range of 20 to 40%;

b. a non-dairy topping or base in a weight concentration range of 20 to 40%;

c. a stabilizer in a weight concentration range of 0.1 to 1%;

d. at least one sweetening agent in a weight concentration range of 1-10%; and e. at least one of mixed eggs and egg yolks in a weight concentration of 0 to 20%;

wherein the non-dairy frozen dessert is at least 5% protein and of a density of at least 0.5 g/cm$^3$.

There is thus provided according to another embodiment of the present invention, a non-dairy vegetarian kosher frozen dessert prepared according to the methods described herein.

Additionally, according to an embodiment of the present invention, the frozen dessert has a density of 0.7-0.9 g/cm3.

Moreover, according to an embodiment of the present invention, the frozen dessert comprises 5-30% protein by weight.

Additionally, according to an embodiment of the present invention, the frozen dessert comprises 0.5-10% carbohydrate by weight.

A non-dairy vegetarian kosher frozen dessert having a density of 0.7-0.9 g/cm3 comprises 5-30% protein by weight and 0.5-10% carbohydrate by weight.

Additionally, according to an embodiment of the present invention, the non-dairy vegetarian kosher frozen dessert is an ice cream.

According to an embodiment of the present invention, the non-dairy vegetarian kosher frozen dessert is an ice cream sorbet.

Additionally, according to an embodiment of the present invention, the light mix is pasteurized. Preferably, the light mix is pre-pasteurized. The present invention will be more fully understood from the following detailed description of the preferred embodiments thereof, taken together with the drawings.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a simplified flowchart of a rapid method for producing a non-dairy frozen dessert, in accordance with an embodiment of the present invention.

FIG. 2 is a simplified flowchart of a method for cold production of a non-dairy frozen dessert, in accordance with an embodiment of the present invention.

FIG. 3 is a simplified flowchart of a rapid method for producing a non-dairy frozen dessert, in accordance with an embodiment of the present invention.

FIG. 4 is a simplified flowchart of a method for cold production of a non-dairy frozen dessert, in accordance with an embodiment of the present invention.

In all the figures similar reference numerals identify similar parts.

DETAILED DESCRIPTION OF THE EMBODIMENTS

In the detailed description, numerous specific details are set forth in order to provide a thorough understanding of the invention. However, it will be understood by those skilled in the art that these are specific embodiments and that the present invention may be practiced also in different ways that embody the characterizing features of the invention as described and claimed herein.

Figure 1:
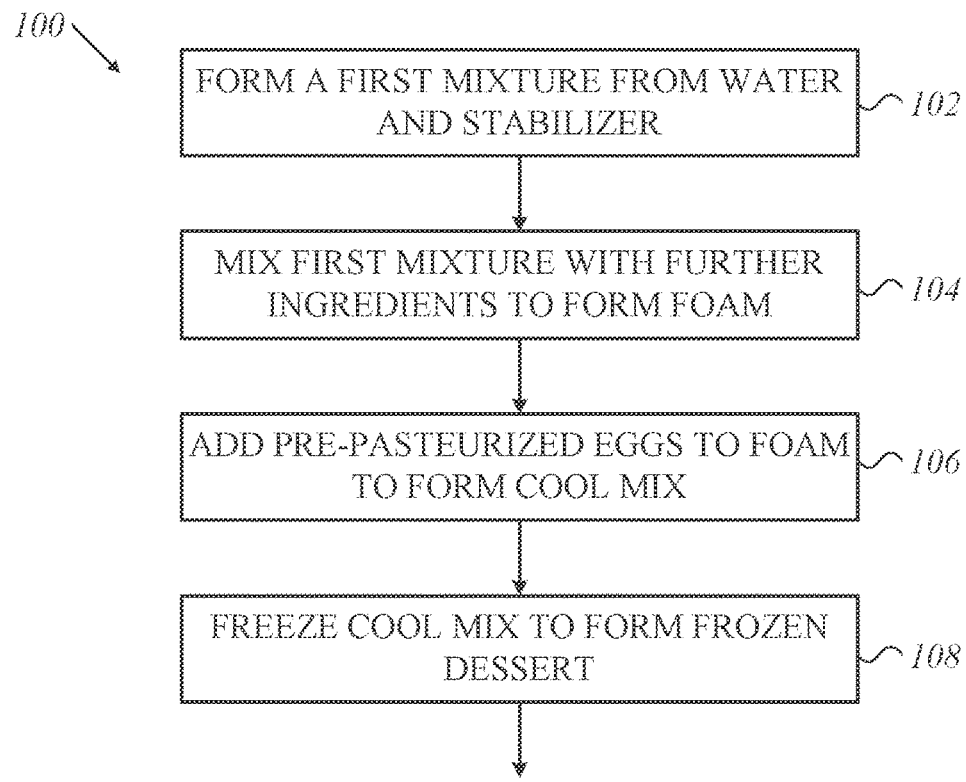

Reference is now made to FIG. 1, which is a simplified flowchart 100 of a rapid method for producing a non-dairy frozen dessert, in accordance with an embodiment of the present invention. The frozen dessert may be called a non-dairy ice cream in some countries.

In a forming first mixture step 102, water and stabilizer are mixed together at a high speed on Morphy Richards Blender 48382 for 5-50 seconds, more preferably, 10-20 seconds at a temperature of 4-30 degrees Celsius. For example, with reference to table 1 below, 470 ml water and 7 grams of stabilizer are mixed to form a first mixture, by methods known in the art. The stabilizer is for example, CREMODAN® stabilizer, (DUPONT, WILMINGTON DELAWARE USA). The stabilizer may contain various gums such as locust bean gum, guar gum and carrageenan, as well as emulsifying agents, such as mono- and di-glycerides of fatty acids. Additionally, according to some further embodiments, the stabilizer may be a blend of stabilizer components. According to some embodiments, the first mixture may be an oil-in-water emulsion.

Thereafter, in a mixing step 104, at a temperature of 4-30 degrees a non-dairy creamer 450 ml, sugar 60 g, flavoring 20-30 gram, are mixed together with the first mixture from step 102 for 30-60 seconds with mixing at a low speed with a Kenwood Mixer KM260 to form a light mix or foam. The non-dairy creamer may be obtained, for example from Glidan, (Glidan Quality 6 Hasadna Kfar Saba, Israel). The non-dairy creamer may contain vegetable fat or shortening, sugars, stabilizers, emulsifiers, potassium sorbate and beta carotene. According to other embodiments, the non-dairy creamer may be Rich's non-dairy cream. The non-dairy creamer may be whipped or non-whipped.

In a second mixing step 106, at a temperature of 4-30 degrees, pre-pasteurized mixed eggs 200 g and 150-180 pre-pasteurized egg yolks are folded into the light mix (which may or may not have been pasteurized) or foam to form a heavy mix or foam. This step takes from around five seconds to up to 20 minutes. It should be understood that many different combinations of mixed eggs/egg yolks are possible. There may be 0-200 g whole liquid eggs and/or of 0-180 g egg yolks.

Optionally, 20 grams of mint chips are added to the heavy mix or foam right before freezing.

Then the heavy mix or foam or foam from step 106 transferred to a batch Freezer or continuous freezer where either choc chips, cookies and/or nuts or other confectionary are added to then be cooled and whipped resulting in a soft frozen dessert consistency This product is then transferred to containers to be frozen at a temperature between −5 degrees and −60 degrees Centigrade in a freeze cool mix step 108.

The frozen dessert product of the present invention typically comprises one or more of the following properties:
1. Density of 0.7-0.9 $g/cm^3$ (denser than most/all commercial frozen desserts)
2. High protein 5-30 g/100 g relative to most/all commercial frozen desserts
3. Kosher
4. No lactose
5. No milk products
6. No meat products
7. Vegetarian
8. Few/no ice crystals
9. Made in a cold process with some ingredients being pre-pasteurized or adding pre-pasteurized eggs to cooled mix.
10. Lower than average sugar/no sugar (some types)

According to some embodiments of the present invention, the frozen dessert product of the present invention typically comprises five or more of the above properties.

According to some further embodiments of the present invention, the frozen dessert product of the present invention typically comprises six or more of the above properties.

According to some embodiments of the present invention, the frozen dessert product of the present invention is an ice cream.

According to some embodiments of the present invention, the frozen dessert product of the present invention is an ice cream sorbet.

According to some embodiments of the present invention, the frozen dessert product of the present invention is a sorbet.

Figure 2:
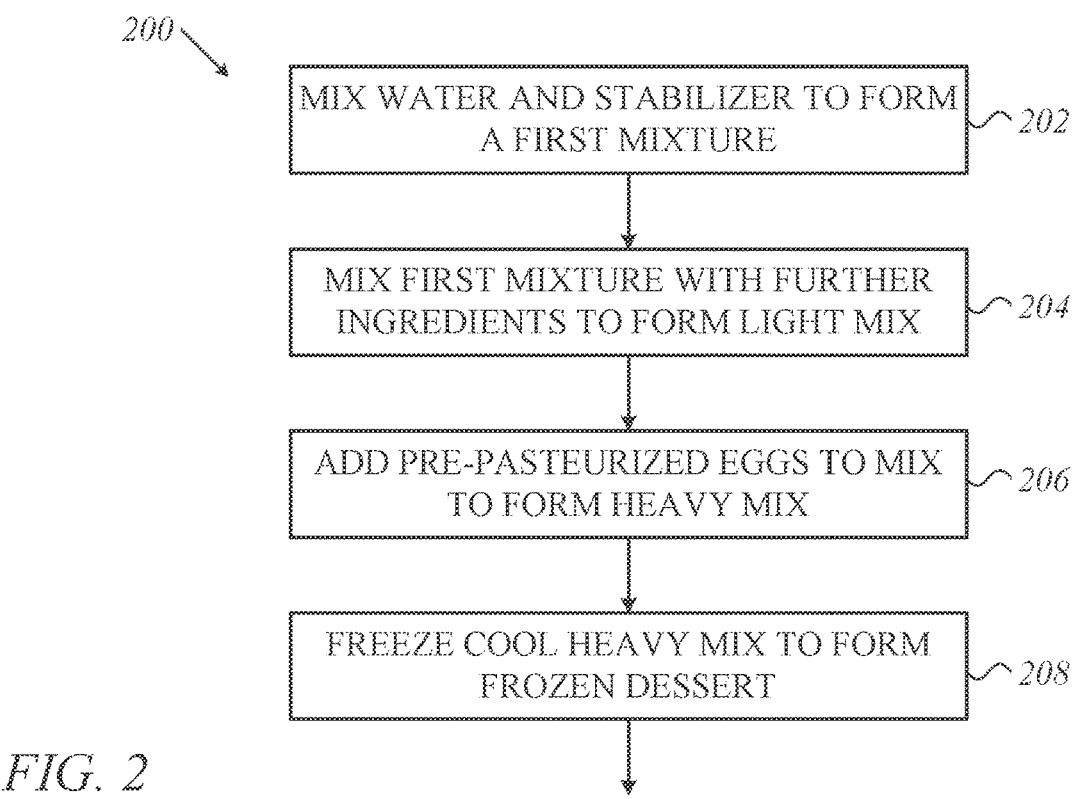

Reference is now made to FIG. 2, which is a simplified flowchart 200 of a method for cold production of a non-dairy frozen dessert, in accordance with an embodiment of the present invention.

In a forming first mixture step 202, water and stabilizer are mixed together at a high speed with a Morphy Richard Blender for 5-50 seconds, more preferably, 10-20 seconds at a temperature of 4-30 degrees Celsius. For example, with reference to table 2 below, 495 ml water and 6 grams of stabilizer are mixed to form a first mixture, by methods known in the art. The stabilizer is for example, CREMODAN® stabilizer, (DUPONT, WILMINGTON DELAWARE USA). The stabilizer may contain various gums such as locust bean gum, guar gum and carrageenan, as well as emulsifying agents, such as mono- and di-glycerides of fatty acids. According to some embodiments, the first mixture formed is an oil-in-water emulsion.

Thereafter, in a mixing step 204, at a temperature of 4-30 degrees a non-dairy creamer 450 ml, sugar 90 g, peanut butter 130 gram, are mixed together with the first mixture from step 202 for 30-60 seconds with mixing at a lowest speed on Kenwood Mixer KM260 to form a light mix or foam. The non-dairy creamer may be obtained, for example from Glidan, (Glidan Quality 6 Hasadna Kfar Saba, Israel). The non-dairy creamer may contain vegetable fat or shortening, sugars, stabilizers, emulsifiers, potassium sorbate and beta carotene. According to other embodiments, the non-dairy creamer may be Rich's non-dairy cream.

The sugar may comprise one or more of sucrose, glucose, fructose, high-fructose corn syrup, honey, dextrose and combinations thereof. Additionally or alternatively, one or more sugar-substitutes, known in the art may be used.

In a second mixing step 206, at a temperature of 4-30 degrees, pre-pasteurized mixed eggs 200 g and 150-180 pre-pasteurized egg yolks are folded into the light mix or foam to form a heavy mix or foam. This step takes around five-20 seconds or up to several minutes.

In a freezing step 208, the heavy mix or foam from step 206 is poured into a batch freezer or continuous freezer where either choc chips, cookies and/or nuts or other confectionary are added to then be cooled and whipped resulting in a soft frozen dessert consistency. It is then poured into containers for freezing and they are frozen, typically at a temperature of −60 to −5 degrees Celsius to form the frozen dessert product, within ten-twelve minutes, for example.

In an embodiment of the present invention, a composition of the present invention includes one or more additional components. Such additional components include but are not limited to anti-static agents, buffering agents, bulking agents, chelating agents, cleansers, colorants, conditioners, diluents, dyes, emollients, fragrances, pearlescent aids, perfuming agents, permeation enhancers, pH-adjusting agents, preservatives, protectants, softeners, solubilizers, viscosity modifiers and vitamins. As is known to one skilled in the art, in some instances a specific additional component may have more than one activity, function or effect.

In an embodiment of the present invention, the additional component is a pH adjusting agent or a buffering agent. Suitable buffering agents include but are not limited to acetic acid, adipic acid, calcium hydroxide, citric acid, glycine, hydrochloric acid, lactic acid, magnesium aluminometasilicates, phosphoric acid, sodium carbonate, sodium citrate, sodium hydroxide, sorbic acid, succinic acid, tartaric acid, and derivatives, and mixtures thereof.

EXAMPLES

Example 1 Composition of Orange-Chocolate Chip Ice-Cream

TABLE 1

| INGREDIENT NAME | WEIGHT [G] | WEIGHT RANGE % |
|---|---|---|
| WATER | 470 | 30-40 |
| NON-DAIRY Topping Base/Whipped Topping | 450 | 30-40 |
| STABILIZER | 7 | 0.4-0.8 |
| SUGAR | 60 | 3.5-5.0 |
| Carte D'Or Orange Syrup | 25-35 | 1-3 |
| MIXED EGGS | 200 | 00-20 |
| EGG YOLKS | 150-180 | 0-20 |
| Choc CHIPS | 70-140 | 1-5 |
|  | 1437 G | 100 |

Example 2

TABLE 2

COMPOSITION OF PEANUT BUTTER ICE-CREAM

| INGREDIENT NAME | WEIGHT [G] | WEIGHT RANGE % |
|---|---|---|
| WATER | 495 | 30-40 |
| NON-DAIRY Topping Base/Whipped Topping | 450 | 30-40 |
| STABILIZER | 6 | 0.4-0.8 |
| SUGAR | 90 | 4.5-7.0 |
| PEANUT BUTTER | 130 | 6-15 |
| MIXED EGGS | 250 | 10-20 |
| EGG YOLKS | 0-100 | 0 |
| TOTAL | 1421 G | 100 |

Example 3 Coffee Frozen Dessert

TABLE 3

COMPOSITION OF COFFEE ICE-CREAM

| INGREDIENT NAME | WEIGHT [G] | WEIGHT RANGE % |
|---|---|---|
| WATER | 430 | 20-40 |
| NON-DAIRY Topping Base/Whipped Topping | 510 | 20-40 |
| STABILIZER | 5-6 | 0.1-1 |
| SUGAR | 70 | 3-6 |
| MIXED EGGS | 200 | 10-20 |
| EGG YOLKS | 180 | 10-20 |
| VANILLA | 4-10 | 0-2 |
| Coffee Extract | 0-8 | 0.1-2 |
| COFFEE GRANULES | 3-5 | 0.1-2 |
| Carte D'or Classic Cappuccino | 25-35 | 0.1-2 |
| TOTAL | 1428-49 G | 100 |

Example 4 Mint Chocolate Chip Frozen Dessert

TABLE 4

COMPOSITION OF MINT CHOCOLATE CHIP ICE-CREAM

| INGREDIENT NAME | WEIGHT [G] | WEIGHT RANGE % |
|---|---|---|
| WATER | 465 | 10-30 |
| NON-DAIRY Topping Base/Whipped Topping CREAMER | 450 | 20-40 |
| STABILIZER | 6 | 0.1-1 |
| SUGAR | 85 | 2-10 |
| Peppermint Extract FLAVOR | 7-14 | 2-10 |
| MIXED EGGS | 200 | 10-20 |
| EGG YOLKS | 165 | 6-20 |
| CHOCOLATE | 70-140 | 10-20 |

TABLE 4-continued

COMPOSITION OF MINT CHOCOLATE CHIP ICE-CREAM

| INGREDIENT NAME | WEIGHT [G] | WEIGHT RANGE % |
|---|---|---|
| CHIPS | | |
| TOTAL | 1448-1525 | 100 |

Example 5 Cookies & Cream

TABLE 5

COMPOSITION OF MADAGASCAR VANILLA ICE-CREAM

| INGREDIENT NAME | WEIGHT [G] | WEIGHT RANGE % |
|---|---|---|
| WATER | 430 | 20-40 |
| NON-DAIRY Topping Base/Whipped Topping | 510 | 20-40 |
| STABILIZER | 7 | 0.1-1 |
| SUGAR | 70 | 1-10 |
| MADAGASCAR VANILLA | 20-40 | 1-3 |
| WHOLE MIXED EGGS | 200 | 0-20 |
| EGG YOLKS | 165 | 0-15 |
| CHOCOLATE CHIPS | 70-140 | 10-20 |
| TOTAL | 1472-1562 | 100 |

Many different flavors and flavoring ingredients, known in the art, may be used to prepare the frozen desserts and/or ice creams of the present invention and the examples provided should not be deemed limiting.

The desserts of the present invention may contain one or more additives. Typically, each additive is present in less than three weight percent of the total product composition. The additives may be selected from the group consisting of an acidifying agent, an anti-static agent, a base, a buffering agent, a bulking agent, a chelating agent, a colorant, a diluent, a dye, a flavoring agent, a fragrance, a pH-adjusting agent, a surfactant, a preservative, a viscosity adjusting agent, and a vitamin.

The one or more vitamins may include any of vitamin A, a vitamin A derivative, a vitamin B, a vitamin B derivative, vitamin C, a vitamin C derivative, vitamin D, a vitamin D derivative, vitamin E, a vitamin E derivative, vitamin F, a vitamin F derivative, vitamin K, a vitamin K derivative.

Suitable buffering agents may include but are not limited to acetic acid, adipic acid, calcium hydroxide, citric acid, glycine, hydrochloric acid, lactic acid, magnesium aluminometasilicates, phosphoric acid, sodium carbonate, sodium citrate, sodium hydroxide, sorbic acid, succinic acid, tartaric acid, and derivatives, and mixtures thereof.

Suitable viscosity adjusting agents may be selected from, but are not limited to, locust bean gum, sodium alginate, sodium caseinate, egg albumin, gelatin agar, carrageenan gum, sodium alginate, xanthan gum, quince seed extract, tragacanth gum, guar gum, cationic guars, hydroxypropyl guar gum, starch and carrageenan.

In some cases, the flavors are added at the end of step 106 or 206, in other cases, they are added at step 104 or 204 (FIGS. 1 and 2, respectively). The flavors may be natural, synthetic or artificial. Non-limiting examples of flavors are caramel, coffee extract, instant coffee, lemon flavor, mint flavor, chocolate flavor, cocoa, vanilla, vanilla extract, fruit extracts, vegetable extracts, fruit juice, vegetable juice and combinations thereof.

The frozen dessert products of the present invention may be produced on a kitchen-scale, home-scale, semi-industrial scale or industrial scale. It should be understood that the steps of the process/methods described with reference to FIGS. 1 and 2 are not meant to limiting. Additional steps may be added. In some cases, the order of the steps may be changed.

For example, on an industrial scale (with reference to FIGS. 1 and 2), the stabilizer may first be mixed with a portion of the sugar. The resulting sweetened stabilizer is then mixed at high speed with water to form a first mixture. In some cases, this mixture is an emulsion. In others, this may be a slurry or suspension. The first mixture may then be mixed with a vegetarian whip (such as Rich's whip topping) to form a light mix (204, FIG. 2). Pre-pasteurized eggs, flavors, additives, and additional sugar may be added at step 206 to form the heavy mix. Alternatively, only the eggs, and sugar are added at this stage. The mixture may be blended for 1-60 minutes, 5-40 minutes, or 20-30 minutes.

Additionally or alternatively, pasteurized liquid eggs can be added to a cool mix during/after step 106 (FIG. 1).

Additionally or alternatively, pasteurized eggs may be added to a pasteurized light mix, such as during/after step 204 (FIG. 2).

Additionally or alternatively, pasteurized eggs may be added to another type of light mix made of almond milk and coconut milk/cream, with optional sugar/sweetener/additives.

Additionally or alternatively, pasteurized eggs may be added to another type of light mix made of almond milk and coconut milk/cream, with optional fruit purees, sugar/sweetener/additives.

An additional optional step of additive addition (not shown 207, in between steps 206 and 208) may optionally be introduced for the addition of additives. Typically this step will take 1-60 minutes, 5-40 minutes, 20-30 minutes or 5-20 minutes. An industrial version of the heavy mix formed in step 206 (FIG. 2) is shown in Table 6.

TABLE 6

Composition of Heavy Mix (Common Base)

| INGREDIENT NAME | WEIGHT RANGE % |
|---|---|
| WATER | 10-50 |
| NON-DAIRY Topping Base/Whipped Topping CREAMER or Glidan or other non-dairy creams or bases | 20-60 |
| STABILIZER | 0.1-2 |
| SUGAR | 2-10 |
| MIXED EGGS | 0-20 |
| EGG YOLKS | 0-20 |
| TOTAL | 100 |

In some cases, the whip is replaced by hydrogenated coconut oil, partially hydrogenated coconut oil, peanut butter and combinations thereof.

In some other cases, hydrogenated coconut oil, partially hydrogenated coconut oil, or peanut butter or combinations thereof are added to the whip to form the heavy mix.

In accordance with some further embodiments of the present invention, additives added to the heavy mix (also termed common base herein in step 206, FIG. 2) include, but are not limited to, colorings, flavorings, preservative, bulking agents and stabilizing agents. According to some embodiments, all of the additives are natural additives. These may include vanilla extract, instant coffee, coffee flavor, Expresso, carbohydrate gum, polysorbate 60, polyglycerol esters of fatty acids, soy lecithin, disodium phosphate, sodium citrate, xanthan gum, guar gum, sodium alginate, carrageenan, lemon juice, lemon extract, turmeric, annatto, sunset yellow coloring, tartrazine, caramel, brilliant blue coloring, mint flavor natural green coloring, mint flavor and combinations thereof. The total percent of additives is typically between 0-20%, 0.1-10%, or 0.5-5%.

Figure 3:
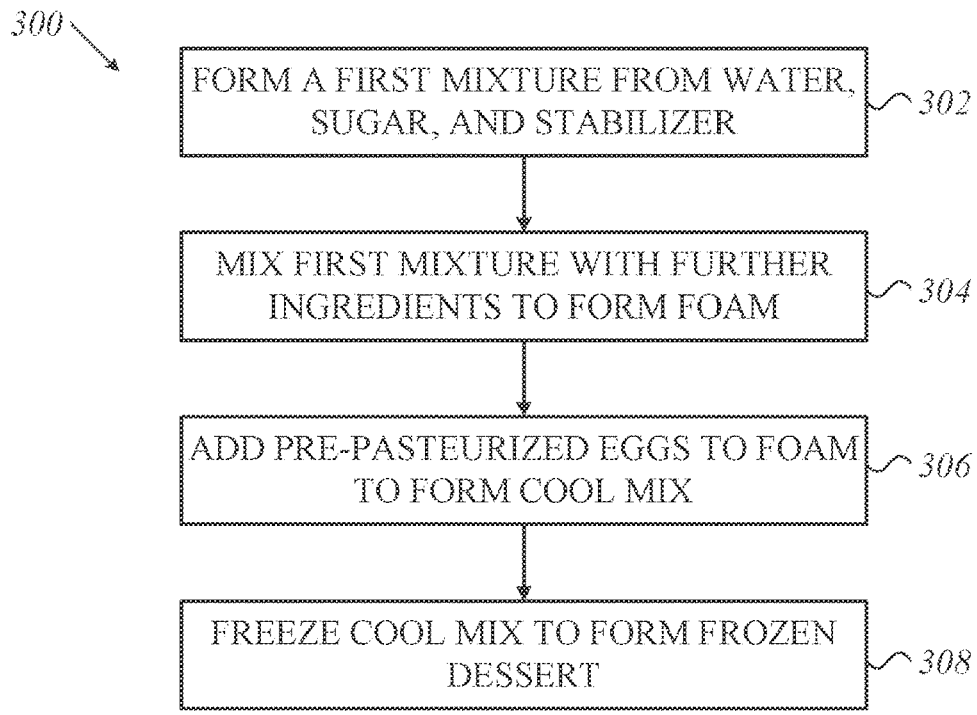

Reference is now made to FIG. 3, which is a simplified flowchart 300 of a rapid method for producing a non-dairy frozen dessert, in accordance with an embodiment of the present invention. The frozen dessert may be called a non-dairy ice cream in some countries.

In a forming first mixture step 302, water, part of the sugar and stabilizer are mixed together at a high speed on Morphy Richards Blender 48382 for 5-50 seconds, more preferably, 10-20 seconds at a temperature of 4-30 degrees Celsius. For example, with reference to table 1 above, 470 ml water, 30 grams sugar and 7 grams of stabilizer are mixed to form a first mixture, by methods known in the art. The stabilizer is for example, CREMODAN® stabilizer, (DUPONT, WILMINGTON DELAWARE USA). The stabilizer may contain various gums such as locust bean gum, guar gum and carrageenan, as well as emulsifying agents, such as mono- and di-glycerides of fatty acids. Additionally, according to some further embodiments, the stabilizer may be a blend of stabilizer components. According to some embodiments, the first mixture formed is an oil-in-water emulsion.

Thereafter, in a mixing step 304, at a temperature of 4-30 degrees a non-dairy creamer 450 ml, second part of sugar, such as, but not limited to sugar 30 g, flavoring 20-30 gram, are mixed together with the first mixture from step 302 for 30-60 seconds with mixing at a low speed with a Kenwood Mixer KM260 to form a light mix or foam. The non-dairy creamer may be obtained, for example from Glidan, (Glidan Quality 6 Hasadna Kfar Saba, Israel). The non-dairy creamer may contain vegetable fat or shortening, sugars, stabilizers, emulsifiers, potassium sorbate and beta carotene. According to other embodiments, the non-dairy creamer may be Rich's non-dairy cream. The non-dairy creamer may be whipped or non-whipped. Additionally or alternatively, another non-dairy base may be used.

In a second mixing step 306, at a temperature of 4-30 degrees, pre-pasteurized mixed eggs 200 g and 150-180 pre-pasteurized egg yolks are folded into the light mix or foam to form a heavy mix or foam. This step takes around five seconds to several minutes It should be understood that many different combinations of mixed eggs/egg yolks are possible. There may be 0-200 g whole liquid eggs and/or of 0-180 g egg yolks.

Optionally, 20 grams of mint chips are added to the heavy mix or foam right before freezing.

Then the heavy mix or foam or foam from step 306 transferred to a batch freezer or continuous freezer where either choc chips, cookies and/or nuts or other confectionary are added to then be cooled and whipped resulting in a soft frozen dessert consistency This product is then transferred to containers to be frozen at a temperature between −5 degrees and −60 degrees Centigrade in a freeze cool mix step 308.

Figure 4:
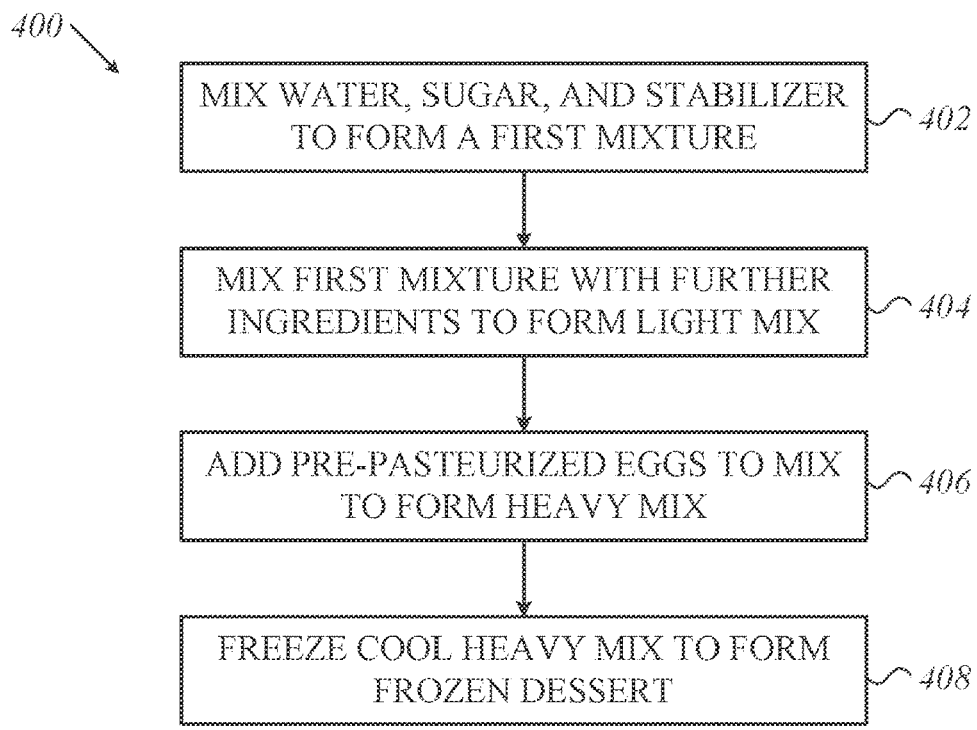

Reference is now made to FIG. 4, which is a simplified flowchart 400 of a method for cold production of a non-dairy frozen dessert, in accordance with an embodiment of the present invention.

In a forming first mixture step 402, water, sugar and stabilizer are mixed together at a high speed with a Morphy Richard Blender for 5-50 seconds, more preferably, 10-20 seconds at a temperature of 4-30 degrees Celsius. For example, with reference to table 2 above, 495 ml water, 45 grams sugar and 6 grams of stabilizer are mixed to form a first mixture, by methods known in the art. The stabilizer is for example, CREMODAN® stabilizer, (DUPONT, WILMINGTON DELAWARE USA). The stabilizer may contain various gums such as locust bean gum, guar gum and carrageenan, as well as emulsifying agents, such as mono- and di-glycerides of fatty acids. According to some embodiments, the first mixture formed is an oil-in-water emulsion.

Thereafter, in a mixing step 404, at a temperature of 4-30 degrees a non-dairy creamer 450 ml, sugar 45 g, peanut butter 130 gram, are mixed together with the first mixture from step 402 for 30-60 seconds with mixing at a lowest speed on Kenwood Mixer KM260 to form a light mix or foam. The non-dairy creamer may be obtained, for example from Glidan, (Glidan Quality 6 Hasadna Kfar Saba, Israel). The non-dairy creamer may contain vegetable fat or shortening, sugars, stabilizers, emulsifiers, potassium sorbate and beta carotene. According to other embodiments, the non-dairy creamer may be Rich's non-dairy cream.

The sugar may comprise one or more of sucrose, glucose, fructose, high-fructose corn syrup, honey, dextrose and combinations thereof. Additionally or alternatively, one or more sugar-substitutes, known in the art may be used.

In a second mixing step 406, at a temperature of 4-30 degrees, pre-pasteurized mixed eggs 200 g and 150-180 pre-pasteurized egg yolks are folded into the light mix or foam to form a heavy mix or foam. This step takes around five-20 seconds.

In a freezing step 408, the heavy mix or foam from step 406 is poured into a Batch Freezer (or continuous freezer) where either choc chips, cookies and/or nuts or other confectionary are added to then be cooled and whipped resulting in a soft frozen dessert consistency. It is then poured into containers for freezing and they are frozen, typically at a temperature of −60 to −5 degrees Celsius to form the frozen dessert product, within ten-twelve minutes, for example.

The references cited herein teach many principles that are applicable to the present invention. Therefore the full contents of these publications are incorporated by reference herein where appropriate for teachings of additional or alternative details, features and/or technical background.

It is to be understood that the invention is not limited in its application to the details set forth in the description contained herein or illustrated in the drawings. The invention is capable of other embodiments and of being practiced and carried out in various ways. Those skilled in the art will readily appreciate that various modifications and changes can be applied to the embodiments of the invention as hereinbefore described without departing from its scope, defined in and by the appended claims.

The invention claimed is:

1. A method for forming a kosher, high-protein, lactose-free, vegetarian, non-dairy frozen dessert, the method comprising:
   a. forming a first mixture by mixing by weight 90.6-98.5% water, 0-8.2% sugar, and 1.1-1.46% stabilizer for a minimum time of five minutes and under twenty minutes using a blender;

b. mixing the first mixture with ingredients comprising at least one of a non-dairy, non-whipped creamer, a non-dairy, non-whipped topping, or a non-dairy, non-whipped base, for under thirty minutes and a minimum time of ten minutes to form a light mix, wherein the weight ratio of the water in the first mixture to the at least one non-dairy, non-whipped topping, a non-dairy, non-whipped creamer, and a non-dairy, non-whipped base is approximately 1:1 c. folding said light mix with at least one pre-pasteurized egg ingredient in for less than twenty minutes and a minimum of ten minutes to form a heavy mix, wherein the weight ratio of said at least one pre-pasteurized egg ingredient to water in the first mixture is 0.375-0.7 to 1; and d. freezing said heavy mix for less than twenty minutes and a minimum of fifteen minutes to form said kosher, high-protein, lactose-free, vegetarian, non-dairy, frozen dessert having a density of 0.7-0.9 g/cm$^3$.

2. A method according to claim 1, wherein said mixing step in b takes a minimum of ten minutes and takes less than twenty minutes.

3. A method according to claim 2, further comprising an additive addition step after said mixing step in b.

4. A method according to claim 1, wherein said ingredients additionally comprise at least one flavor, a sweetening agent and a non-dairy cream or creamer.

5. A method according to claim 4, wherein said sweetening agent is selected from sugar, syrup, an artificial sweetener and stevia.

6. A method according to claim 4, wherein said non-dairy non-whipped creamer weight to said first mixture weight is in a weight ratio of 1000:1 to 5:1.

7. A method according to claim 1, wherein each of said steps of said method is performed at a temperature of less than 20 degrees Celsius.

8. A method according to claim 1, wherein said light mix is pasteurized.

9. A method according to claim 5, wherein said frozen dessert comprises 0.5-10% carbohydrate by weight.

10. A method according to claim 1, wherein said freezing step is a performed in a continuous freezer.

* * * * *